(12) United States Patent
Ito et al.

(10) Patent No.: US 7,193,531 B2
(45) Date of Patent: Mar. 20, 2007

(54) METHOD FOR PROVIDING SECURITY

(75) Inventors: Hayuru Ito, Kawasaki (JP); Shigeru Yamada, Kawasaki (JP); Yuji Kijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 10/914,222

(22) Filed: Aug. 10, 2004

(65) Prior Publication Data
US 2005/0009536 A1    Jan. 13, 2005

Related U.S. Application Data

(63) Continuation of application No. PCT/JP02/01394, filed on Feb. 18, 2002.

(51) Int. Cl.
*G08G 1/123*    (2006.01)

(52) U.S. Cl. ............... 340/988; 340/539.18; 340/573.1; 340/574; 340/7.5; 340/825.49; 455/404.1; 455/521

(58) Field of Classification Search ............... 340/988, 340/539.13, 539.18, 539.11, 573.1, 575, 573.4, 340/7.5, 825.36, 825.49; 455/404.1, 404.2, 455/414.1, 456.1, 521
See application file for complete search history.

(56) References Cited

U.S. PATENT DOCUMENTS

| | | | | |
|---|---|---|---|---|
| 5,515,419 | A * | 5/1996 | Sheffer | 455/456.5 |
| 5,731,757 | A | 3/1998 | Layson, Jr. | |
| 6,055,438 | A * | 4/2000 | Winner, Jr. | 455/521 |
| 6,092,695 | A * | 7/2000 | Loeffler | 222/207 |
| 6,563,910 | B2 * | 5/2003 | Menard et al. | 379/45 |
| 6,577,848 | B1 * | 6/2003 | Gregg et al. | 455/13.2 |
| 6,696,956 | B1 * | 2/2004 | Uchida et al. | 340/573.1 |
| 2001/0001561 | A1 | 5/2001 | Coles | |

FOREIGN PATENT DOCUMENTS

| | | |
|---|---|---|
| JP | 2001-211437 | 8/2001 |
| JP | 2001-217959 | 8/2001 |
| JP | 2001-307256 | 11/2001 |
| JP | 2001-320777 | 11/2001 |

OTHER PUBLICATIONS

Communication from European Patent Office dated Dec. 20, 2005.

* cited by examiner

*Primary Examiner*—Davetta W. Goins
(74) *Attorney, Agent, or Firm*—Staas & Halsey LLP

(57) ABSTRACT

Using a mobile terminal while moving, a user has a voice conversation with a security terminal provided by a security service provider. This conversation creates a situation in which it is possible to immediately send an alarm if an emergency occurs, thus repelling assaulters or abductors lurking near the user. The mobile terminal is provided with GPS or the like, and position information of the mobile terminal is sent to the security terminal. The security service provider takes advertisements from advertisers selling goods or services, and prepares conversation scenarios that are the content of the conversations for automatic response based on those advertisements. The security terminal firstly provides the user with a voice conversation partner proxy service based on the conversation scenarios and secondly detects emergencies by detecting emergency messages from the mobile terminal or detecting the interruption of the conversation. After that, the security service provider can restrict the danger to the user to a minimum by undertaking emergency measures such as dispatching someone to the location where the mobile terminal is located.

19 Claims, 5 Drawing Sheets

| user ID |
|---|
| name |
| security number |
| age |
| gender |
| photo portrait |
| blood type |
| address |

*Fig. 3A*

| advertiser ID |
|---|
| advertiser name |
| scenario ID |
| usage track record |
| |
| scenario ID |
| usage track record |
| advertising fees |

*Fig. 3B*

METHOD FOR PROVIDING SECURITY

This is a continuation of International Application PCT/JP02/01394, with an international filing date of Feb. 18, 2002.

FIELD OF THE INVENTION

The present invention relates to technology for providing a service ensuring the safety of a user having a device sending position information.

BACKGROUND ART

As crime has been on the rise in recent years, there are various endeavors for preventing crime around us. For example, one way to protect women and children returning home over dark streets at night from assault or abduction is to have a telephone conversation with family or friends from a mobile terminal until reaching home. The purpose of this is to restrain potential assaulters or abductors by establishing a situation in which such a crime would be reported immediately, and thus to prevent the crime before it happens. Furthermore, services are offered that use a system detecting position information of a user having a position information transmission device such as a GPS (Global Positioning System) transmitter, and that dispatch someone to the location of the user to ensure his or her safety. With this service, when the family decides that a woman or child carrying the position information transmission device is later than usual, then the family can ensure the safety of the woman or child by making a corresponding request to the provider of the service.

However, in the first of the above-describe methods, there are the following problems:

a) there is no guarantee that someone can be found who can take a call;

b) perhaps not so much in the case of family, but if the taker of the call is a friend or an acquaintance, then the call may be perceived as an annoyance;

c) if something serious happens, it is difficult to establish or confirm the scene of the crime;

d) if a rescue action has come to be necessary, the called person going out for rescue may face a dangerous situation;

e) the fees for the call may be burdensome;

And the second of the above-described methods poses the following problems:

f) the user's family has no means to know about an emergency, so that the request to the service operator is delayed;

g) there is no measure for preventing an emergency before it happens;

h) the fees for using the service may be burdensome;

If the first method of "a constant telephone conversation from a mobile terminal" and the second method of "a service using a position information detection system" are combined, and a service acting as a proxy for the party called by the user is added to the latter service, then the problems a), b), c) and d) can be solved. However, the following problems may occur additionally:

i) the burden on the service operator is large, because a large number of operators need to be hired and trained to provide the telephone proxy service for a large number of users;

j) the burden on the service operator due to personnel costs for those operators is large;

k) for the user, the burden due to the fees for using the service increase when combining the two services;

l) since the users utilizing the telephone proxy service are not family members, friends or acquaintances of the called party, there is the possibility of hoaxes and prank calls that are a nuisance to the service operator. The service provider suffers unnecessary costs by responding to these;

m) the service provider suffers unnecessary costs by responding to false alarms, in which the user erroneously sends information indicating that there is an emergency situation, for example;

n) the operator needs to come up with a topic of conversation (i.e. content) when being called.

SUMMARY OF THE INVENTION

In order to solve the above-described problems, a method for providing security to be executed by a computer according to an aspect of the present invention comprises:

a storage step of storing conversation scenarios that are content for voice conversations carried out with a user operating a mobile terminal;

an automatic response step of exchanging audio data with a user's mobile terminal in accordance with any of the conversation scenarios;

a position information obtaining step of obtaining position information of the user's mobile terminal;

an emergency detection step of detecting an emergency involving the user; and an emergency output step of outputting an occurrence of an emergency if an emergency has been detected.

This method is applied to a computer or a service provider providing a security service. The computer performs a conversation by voice with a user, in accordance with a stored conversation scenario. If the conversation breaks off or an emergency notification signal is sent from the mobile terminal, then the computer judges that there is an emergency, and a signal indicating that an emergency has occurred is output to a display or a speaker. After confirmation by direct conversation with the user or by video from the mobile terminal, the operator of the computer may then request help.

It is preferable that the emergency detecting step detects an emergency based on a change of position information obtained in the position information obtaining step. Thus, crimes such as abduction can be quickly detected.

It is preferable that the emergency detection step detects an emergency based on how the conversation scenario progresses in the automatic response step. Thus, it is possible to quickly detect that a crime has occurred or that the user is unable to answer due to a sudden illness or the like.

It is preferable that the emergency detection step detects an emergency by receiving a signal indicating an emergency from the user's mobile terminal.

The method for providing security preferably further comprises a request sending step of receiving input of a rescue request signal requesting rescue of a user in an emergency, and sending the rescue request signal and position information of the user's mobile terminal to a computer to which the rescue signal is sent. The place where the rescue signal is sent may be a computer operated for example by the police, the fire department or a security company. The operator of the computer receiving the signal may then quickly dispatch a watchman or a rescue team.

In another aspect, the method for providing security further comprises a user storage step of storing personal information of a user, wherein, in the request sending step, personal information of the user in an emergency is sent to said computer. For example, by sending the user's blood type, it is possible to act accordingly if an emergency blood transfusion has become necessary.

In yet another aspect, the method for providing security further comprises a telephone communication step of receiving in instruction of direct telephone communication with the user from an operator of said computer, receiving audio input of the operator and sending the audio input to the user's mobile terminal, and outputting the received audio from the mobile terminal. According to this aspect, the operator of the computer can directly talk by phone with the user of the mobile terminal.

In yet another aspect, the method further comprises a history storage step of storing a usage history of conversation scenarios, and a history update step of updating the usage history of conversation scenarios executed by the automatic response step. The usage history may include, for example, the number of times that a conversation scenario was used, and the corresponding advertising fees for the conversation scenario.

In the method for providing security, examples of the position information obtaining step are obtaining the position information by GPS (Global Positioning System) and obtaining position information that is calculated based on information of a base station or the like that is connected when the mobile terminal is communicating.

Furthermore, in the automatic response step, a database may be accessed that stores the conversation scenarios that are the content for the voice conversation performed with the mobile terminal of the user, and audio data is exchanged with the user's mobile terminal in accordance with one of the conversation scenarios in the database. This has the advantage that the security service provider does not have to provide new conversation scenarios.

It is preferable that in the automatic response step, the exchange of audio data is performed via a plurality of networks with different communication protocols. Thus, various services can be provided to the user via the computer.

It is preferable that, in the emergency output step, image data is received from the user's mobile terminal, and the image data is output. Thus, the operator of the user can immediately determine whether there is an emergency.

It is preferable that the method for providing security further comprises an authentication information storage step of storing information authenticating the user, and that in the automatic response step, a connection request is received from the user's mobile terminal, and an authentication of the user is performed in accordance with the authentication information. By authenticating the user, it is possible to prevent prank calls.

According to another aspect of the present invention, a device for providing security comprises:

a storage means for storing conversation scenarios that are content for voice conversations carried out with a user operating a mobile terminal;

an automatic response means for exchanging audio data with a user's mobile terminal in accordance with any of the conversation scenarios;

a position information obtaining means for obtaining position information of the user's mobile terminal;

an emergency detection means for detecting an emergency involving the user; and an emergency output means for outputting a signal indicating an emergency if an emergency has occurred.

According to yet another aspect of the present invention, a program for providing security lets a computer function as:

a storage means for storing conversation scenarios that are content for voice conversations carried out with a user operating a mobile terminal;

an automatic response means for exchanging audio data with a user's mobile terminal in accordance with any of the conversation scenarios;

a position information obtaining means for obtaining position information of the user's mobile terminal;

an emergency detection means for detecting an emergency involving the user; and an emergency output means for outputting a signal indicating an emergency if an emergency has occurred.

According to yet a further aspect of the present invention, a computer-readable recording medium stores a program for providing security to be executed by a computer, for executing:

a storage step of storing conversation scenarios that are content for voice conversations carried out with a user operating a mobile terminal;

an automatic response step of exchanging audio data with a user's mobile terminal in accordance with any of the conversation scenarios;

a position information obtaining step of obtaining position information of the user's mobile terminal;

an emergency detection step of detecting an emergency involving the user; and an emergency output step of outputting a signal indicating an emergency if an emergency has occurred.

BRIEF DESCRIPTION OF THE DRAWINGS

Outline of the Invention

FIG. 3A is a schematic diagram of the personal information stored in the user DB of FIG. 2.

FIG. 3B is a schematic diagram of history information stored in the usage history DB of FIG. 2.

DESCRIPTION OF THE PREFERRED EMBODIMENTS

Figure 1:
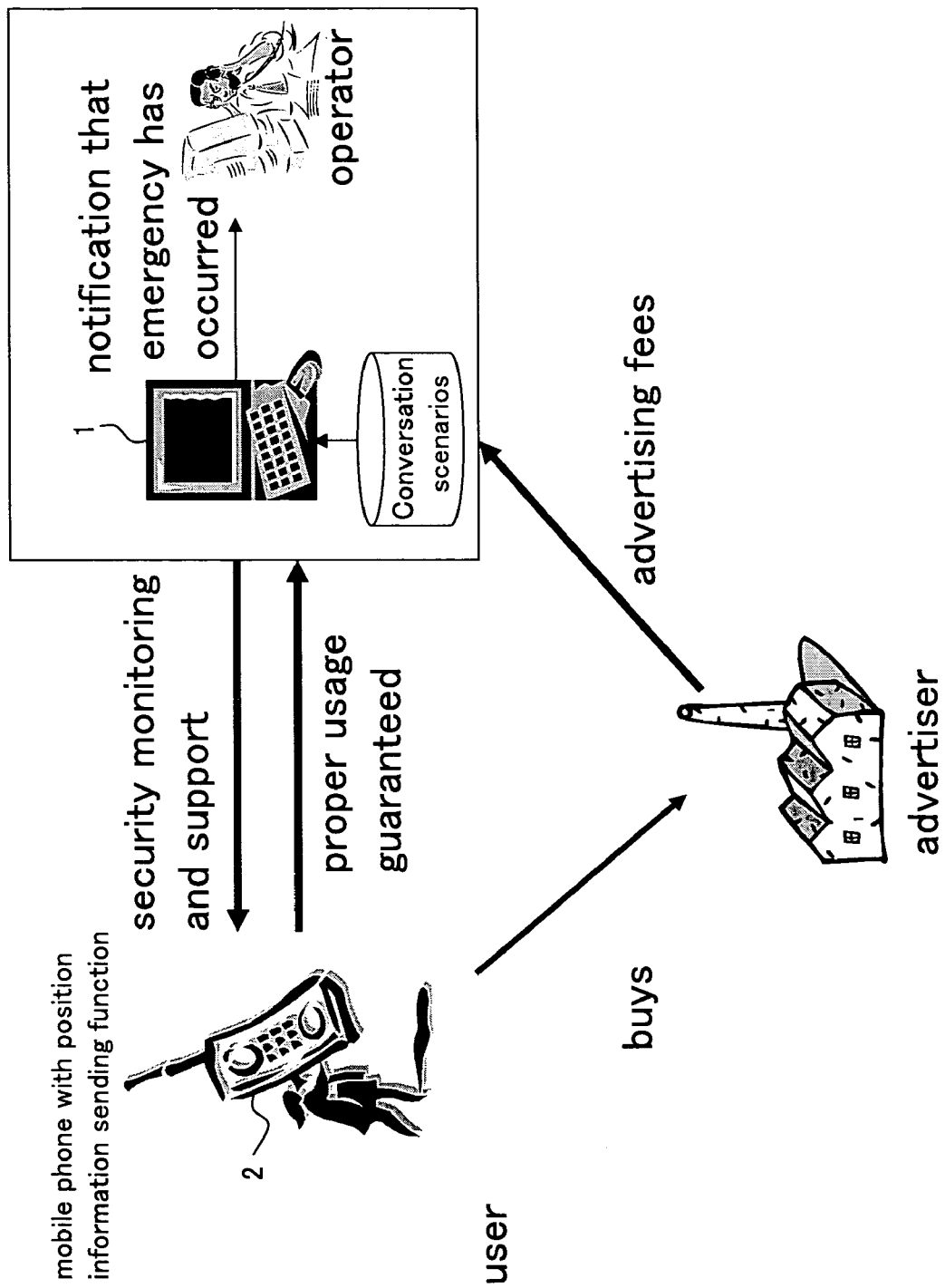
FIG. 1 is a schematic diagram of a security service using a method for providing security according to the present invention.

FIG. 1 is a schematic diagram of a security service using a method for providing security according to the present invention. The security service is provided to the user of a mobile terminal 2 by a security service provider who operates a security terminal 1. The operating costs for the security service can be recovered from advertising revenues obtained from advertisers who sell goods or services.

Using the mobile terminal 2 while moving around, the user has a conversation, by voice, with the security terminal 1 provided by the security service provider. This conversation creates a situation in which a distress signal can be sent out immediately, thus repelling potential assaulters or abductors lurking close to the user. Thus, one can expect that assaults on the user can be thwarted before they occur. If the position of the mobile terminal 2 is obtained using GPS, then information indicating the position of the mobile terminal 2 is sent from a position information sending device using GPS provided in the mobile terminal 2 to the security terminal 1. If the position of the mobile terminal 2 is obtained from a state of communication with a base station of a mobile communication network, then information indicating the position of the mobile terminal 2 is sent from a position information detection system to the security terminal 1. Here, the position information detection system measures the position of the mobile terminal from the state of communication between the mobile terminal 2 and the base station of the mobile communication network or the like.

The security service provider takes advertisements from advertisers selling goods or services, and, based on the advertisements, prepares conversation scenarios serving as the content for conversations for automatic responses. The security terminal 1 firstly provides the user with a voice conversation partner proxy service based on the conversation scenario, and secondly detects emergencies by detecting emergency messages from the mobile terminal 2 or detecting the interruption of the conversation. After that, the security service provider can restrict the danger to the user to a minimum by undertaking emergency measures such as dispatching someone to the location where the mobile terminal 2 is located. Moreover, the security service provider collects advertising fees from the advertiser, and provides the security service to the user for a low fee or for free. If a user authentication is performed when the security terminal 1 is connected to the mobile terminal 2, then it is also possible to avert hoaxes and prank calls.

The advertiser selling goods or services (in the following also referred to as "goods") obtains the opportunity to advertise using a new medium, by providing his advertisements in the form of material for the conversation scenario. Thus, the advertiser can expect an increase in sales of his goods or services.

First Embodiment

Overall Configuration

Figure 2:
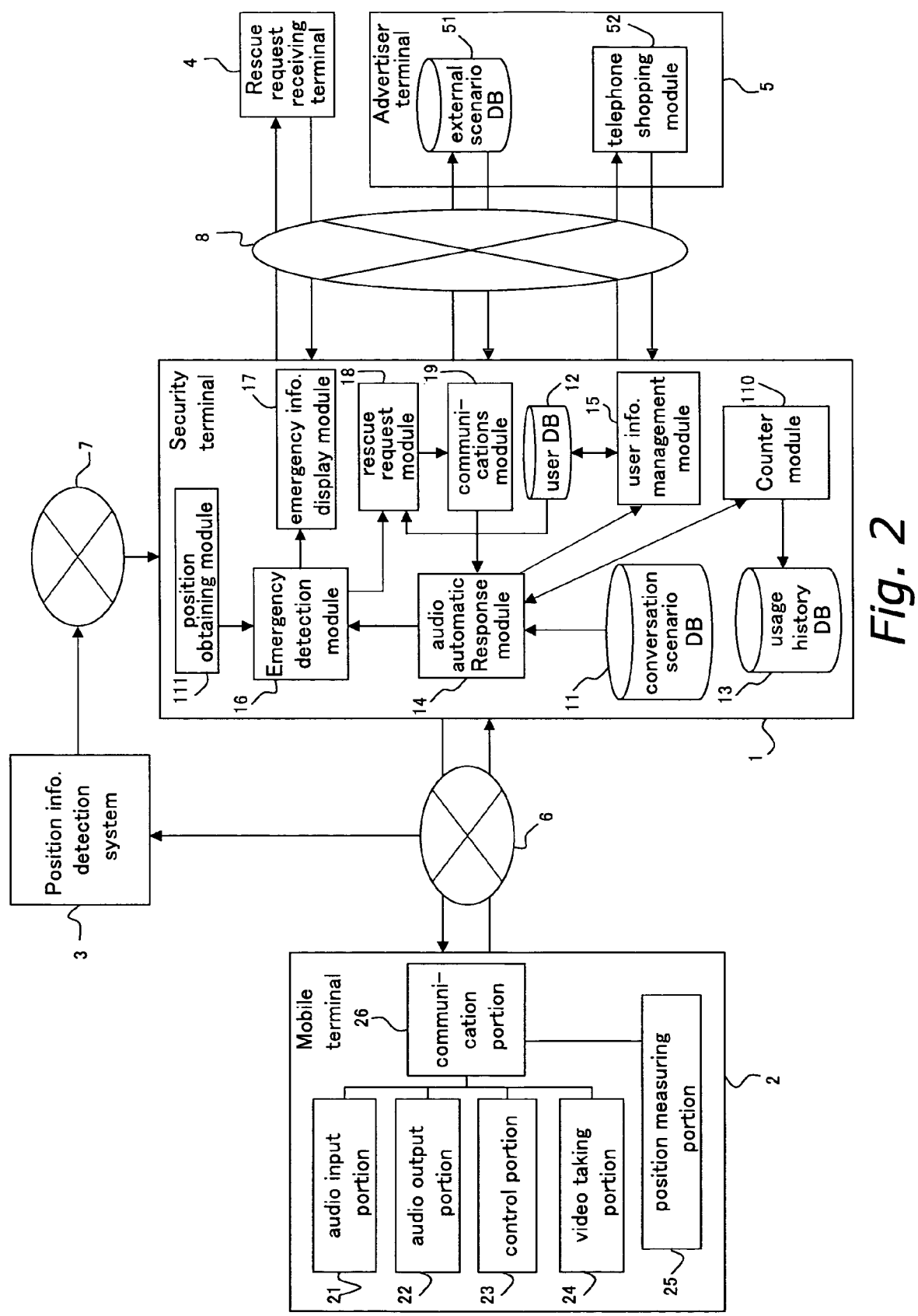
FIG. 2 is a diagram of the overall configuration of a security system using a method for providing security according to a first embodiment.

FIG. 2 is a diagram of the overall configuration of a security system using a method for providing security according to a first embodiment. This security system includes a security terminal 1, a mobile terminal 2, a rescue request receiving terminal 4 and an advertiser terminal 5. Only one mobile terminal 2, one rescue request receiving terminal 4 and one advertiser terminal 5 are shown in the figure, but it is also possible to provide a plurality of each. The security terminal 1 and the mobile terminal 2 can be connected via a mobile communication network 6. The security terminal 1, the rescue request receiving terminal 4 and the advertiser terminal 5 can be connected via a network 8 such as the Internet, a public telephone network or ISDN. The security terminal 1 is connected via a network 7 to a position information detection system 3, and the mobile terminal 2 is connected via the mobile communication network 6 to the position information detection system 3. Here, the position information detection system 3 is configured including a base station (not shown in the drawings) that relays communication between mobile terminals, calculates the relative position of the mobile terminal with respect to the base station based on the communication between the base station and the mobile terminal 2, and calculates the approximate absolute position of the mobile terminal 2 from this relative location and the absolute position of the base station.

The security terminal 1 can be realized using a computer having a function of connecting to the mobile communication network 6, the network 7 and the network 8. The function of the security terminal 1 is explained in more detail later.

The mobile terminal 2 may be a mobile phone, a video camera, a PDA (Personal Digital (Data) Assistant) or any other portable computer with which audio can be input and output and that has a function of connecting to the mobile communication network 6. The mobile terminal 2 includes an audio input portion 21, such as a microphone, an audio output portion 22, such as a speaker, a control portion 23 including switches or buttons or the like, a video taking portion 24, such as a CCD camera, a position measuring portion 25, and a communication portion 26. Of these structural elements, the video taking portion 24 is not a mandatory element, but if it is present, then it is possible to send image data to the security terminal 2, which is preferable. The position measuring portion 25 can be realized by using a function such as GPS, for example. A position measuring portion 25 using GPS functionality receives data sent from an artificial satellite (not shown in the drawings) that is part of the GPS, and calculates the absolute position of itself.

The rescue request receiving terminal 4 can be realized by a computer that is operated by a rescue service operator providing the rescue service. This computer has the capability to connect to the network 8. Here, rescue service means a service in which the operation of a sensor installed at the user's home is monitored and a rescue team member or a watchman is dispatched to the location. Moreover, rescue service also means a service in which a rescue team member or watchman is dispatched to a specific location in response to an alarm from the security terminal 1. The organization performing the rescue service may be a private enterprise, but it may also be the police or the fire department.

The advertiser terminal 5 can be realized by a computer that is operated by the advertiser. This computer may be set up at the advertiser's company or store. The advertiser terminal 5 has an external scenario database 51 storing conversation scenarios prepared based on the advertisement for the advertiser's goods or the like. The conversation scenarios are prepared such that there is a conversation by voice between the user and the computer, prompting the user continuously for a response. Each conversation scenario is unambiguously identified by a scenario ID. The advertiser terminal 5 also includes a telephone shopping module 52. The telephone shopping module 52 receives orders for the advertiser's goods or the like by telephone, and provides a telephone shopping service. Here, the telephone shopping service is an example of a service other than the services provided by the security terminal 1.

The Security Terminal

The following is an explanation of the functionality of the security terminal 1. The security terminal 1 includes three databases (DB), namely a conversation scenario DB 11, a user DB 12 and a usage history DB 13, as well as a plurality of modules. First, these databases are explained, and then the functionality of the modules is explained.

(1) Conversation Scenario DB

The conversation scenario DB 11 stores conversation scenarios prepared by the advertiser himself as well as conversation scenarios prepared by the operator of the security terminal 1. In this embodiment, the conversation scenarios are prepared based on advertisements and questionnaires or the like provided by the advertiser. Similar to the conversation scenarios of the external scenario DB 51, the conversation scenarios in the conversation scenario DB 11 are prepared such that there is a conversation by voice between the user and the computer, prompting the user continuously for a spoken response. Each conversation scenario is unambiguously identified by a scenario ID.

An example of such a conversation scenario is a conversation scenario in which advertisements for products are acoustically replayed one after another, and when proceeding to the replaying of an advertisement for another product, a spoken instruction is necessary to proceed. This instruction to proceed may be for example the spoken instruction "Next" or it may be a spoken "Yes" in response to the question "Proceed to next ad?" An example of another conversation scenario is a conversation scenario in which answers to a simple questionnaire are requested after replaying each ad for a product.

(2) User DB

FIG. 3A is a schematic diagram of the personal information stored in the user DB 12. In this example, the user DB includes personal information including the following data in each record:

User ID: authentication information for unambiguously identifying the user of the security terminal 1;

name: the user's name;

security number: authentication information such as a password registered by the user himself;

age: the user's age gender: the user's gender;

photo portrait: image file of the user's face or address thereof;

blood type: the user's blood type;

address: the user's address;

The user's ID and security number are personal information used for authenticating the user when the user connects to the security terminal 1. Regarding the other personal information, it is preferable that data is stored as necessary and appropriate in consideration of the rescue service provided by the rescue request receiving terminal 4.

(3) Usage History DB

FIG. 3B shows a schematic diagram of history information stored in the usage history DB 13. In this example, the history information includes the following data in each record:

advertiser ID: identification information with which the security terminal 1 can unambiguously identify the advertiser;

advertiser name: company name or personal name of the advertiser;

scenario ID: identification information specifying the scenario prepared based on an advertisement for the goods or the like of the advertiser specified by the advertiser ID;

number of usages: number that the conversation scenario specified by the scenario ID has been used, for example;

advertising fee: advertisement fee for a given period that is charged to the advertiser;

If an advertiser has a plurality of scenarios stored in the conversation scenario DB 11 or the later-described external scenario DB 51, then a combination of scenario IDs and usage numbers thereof is stored for each scenario in the usage history DB.

(4) Module Functionality

The following is a more specific explanation of the functionality of the modules of the security terminal 1 shown in FIG. 2. The security terminal 1 includes an audio automatic response module 14, a user information management module 15, an emergency detection module 16, an emergency information display module 17, a rescue request module 18, a communications module 19, a counter module 110, and a position obtaining module 111. These modules perform mainly three processes: a conversation process, a position detection process and an emergency detection process. The functionality of the modules is explained while explaining these processes in order more specifically.

(4-1) Conversation Process

Figure 4:
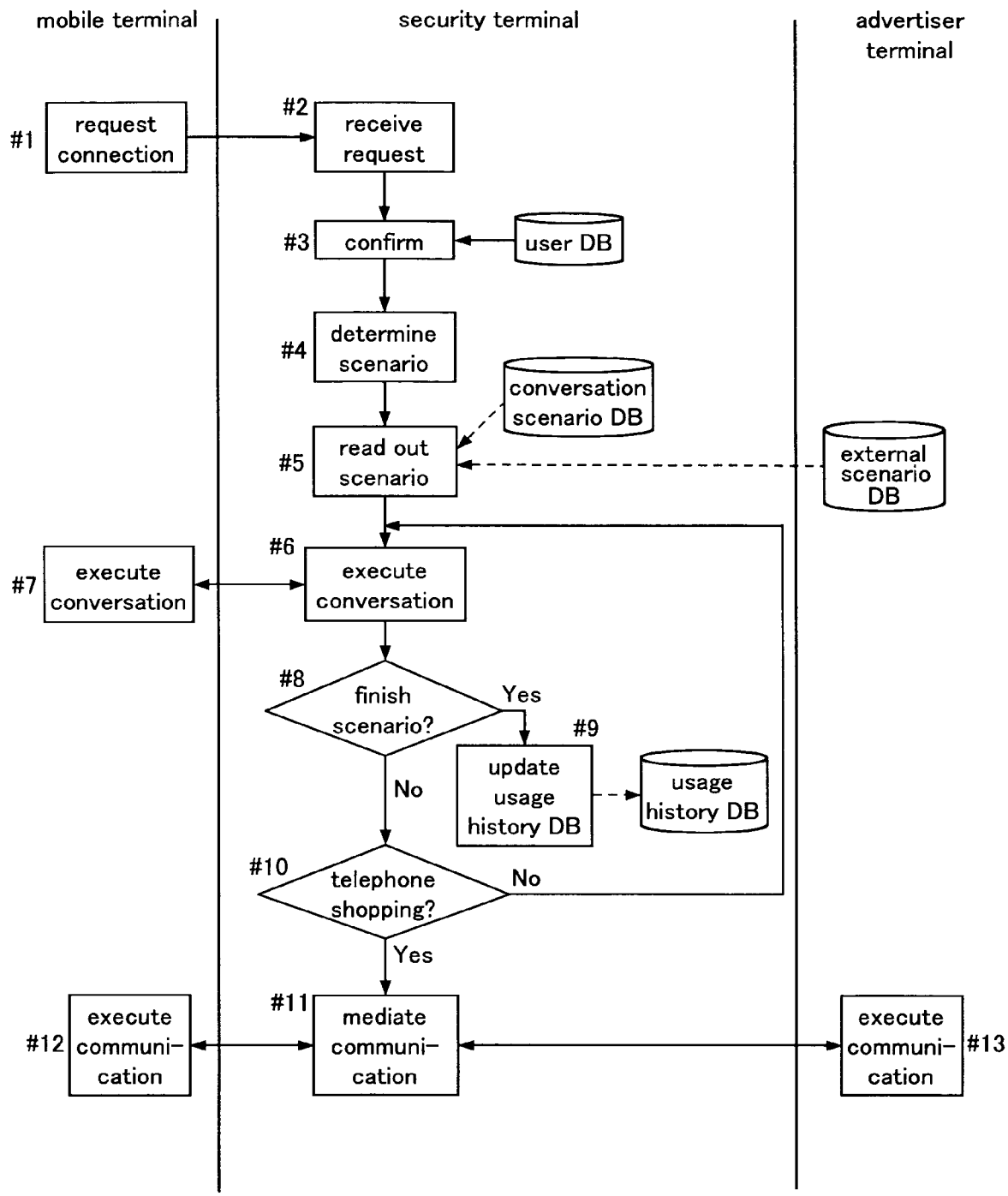
FIG. 4 is a diagram showing an example of the flow of the conversation process in the security system of FIG. 2.

FIG. 4 is a diagram showing an example of the flow of the conversation process. In response to a user instruction, the mobile terminal 2 sends a connection request to the security terminal 1, and a connection is established (#1, #2). For example, when the user wants to establish a conversation situation, such as when walking on a dark street at night, then the user can connect via the mobile communication network 6 to the security terminal 1, using the mobile terminal 2. The audio automatic response module 14 of the security terminal 1 confirms whether the operator of the mobile terminal 2 that has connected is the user who has been registered in the user DB 12 (#3). For example, the audio automatic response module 14 performs an authentication by matching the security number that the user information management module 15 has read from the user DB 12 with a number entered by the user himself or herself into the control portion 23.

After the user has been authenticated, the audio automatic response module 14 determines a conversation scenario to be executed (#4). For example, if a conversation scenario is specified during the connection request from the mobile terminal 2, then the specified conversation scenario is read out from either the conversation scenario DB 11 or the external scenario DB 51. For example, if conversation scenarios are prepared for various genres, and the number for connecting to the security terminal 1 is set for each genre, then it is possible to determine a conversation scenario based on the connection request. Moreover, the audio automatic response module 14 may receive the selection of any of the plurality of conversation scenarios by voice operation or operation of the control portion 23.

After the conversation scenario has been determined, the audio automatic response module 14 reads out the conversation scenario from the conversation scenario DB 11 or the external scenario DB 51, and executes the voice conversation with the user operating the mobile terminal 2 (#5, #6, #7). The conversation scenario is prepared so as to continuously prompt for a response by the user, so that a conversation situation is created in which a conversation is continuously carried out between the mobile terminal 2 and the security terminal 1. Whenever there is a user response to a question from the security terminal 1, the audio automatic response module 14 judges whether the conversation scenario has been finished or not (#8). If the audio automatic response module 14 judges that the conversation scenario has been finished, then the scenario ID of the finished conversation scenario is notified to the counter module 110. The counter module 110 updates the usage track record of the finished conversation scenario (#9). More specifically, the usage number of the conversation scenario is increased by 1. For example once per month, the counter module 110 calculates the advertising fee for each conversation scenario in accordance with the usage number of the conversation scenario for one month, and calculates the advertising fees invoiced to the advertiser based on the advertising fees for the conversation scenarios.

If the conversation scenario has not finished, the audio automatic response module 14 judges whether there was a response requesting a connection to another computer, for example to the advertiser terminal 5 (#10). If "Yes," then the audio automatic response module 14 connects via the network 8 to the advertiser terminal 5, and mediates the communication between the mobile terminal 2 and the advertiser terminal 5 (#11, #12, #13). Mediation of communication means that for example if the communication protocols used by the mobile communication network 6 and the network 8 are different, then the audio automatic response module 14 converts the communication protocols (#11). The telephone shopping module 52 of the advertiser terminal 5 takes orders for goods or the like, following the voice instructions send from the mobile terminal 2 via the security terminal 1 (#13). Thus, the user can utilize other services, such as telephone shopping services provided by the advertiser terminal 5, via the security terminal 1. If the conversation scenario is not finished, and if there is no request to connect to the advertiser terminal 5, then the conversation scenario continues.

(4-2) Position Detection Process

Figure 5:
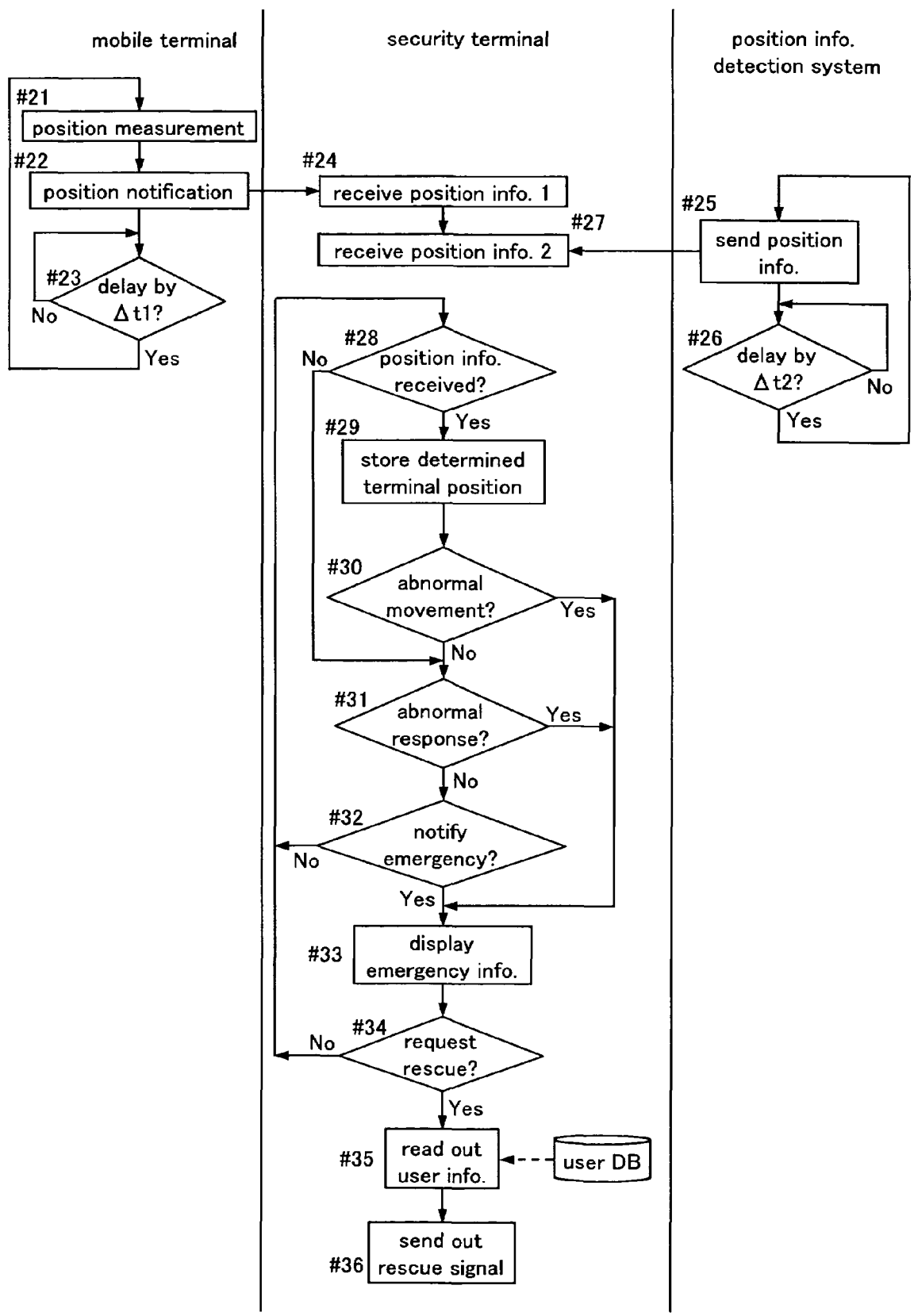
FIG. 5 is a diagram showing an example of the flow of the position detection process and the emergency detection process in the security system of FIG. 2.

FIG. 5 is a diagram showing an example of the flow of the position detection process and the emergency detection process. The two processes are performed independently. The position measurement portion 25 of the mobile terminal 2 receives data sent at constant time intervals $\Delta t1$ by an artificial satellite or the like to measure the geographical position of the mobile terminal 2 (#21, #22, #23). The position measurement portion 25 sends the measurement result via the mobile communication network 6 to the security terminal 1 (#24). On the other hand, the position obtaining module 111 of the security terminal 1 receives, for example at constant time intervals $\Delta t2$, position information of the mobile terminal 2 from the position information detection system 3 (#25, #26, #27).

(4-3) Emergency Detection Process

The emergency detection module 16 of the security terminal 1 determines the position of the mobile terminal 2 based on the position information received from the mobile terminal 2 or the position information detection system 3, and stores this position (#28, #29). In this example, the scheme of letting the mobile terminal 2 itself detect its own position and notify it to the security terminal 1 is combined with the scheme of measuring this position from the presence and status of the mobile terminal 2 within the mobile communication network 6, but it is also possible to employ only one or the other of these schemes. Moreover, it is also possible to employ any other scheme, as long as the position of the mobile terminal 2 can be measured. The emergency detection module 16 receives and stores the new position information, and judges whether an anomalousness has occurred in the movement of the mobile terminal 2. An anomalousness is for example when the mobile terminal 2 stays too long at the same position, or when the movement speed or movement direction change abruptly. If it is judged that an anomalousness has occurred, then the procedure advances to (#33).

The emergency detection module 16 further detects anomalous responses to the conversation scenario. It is expected that the user gives continuous responses in accordance with the conversation scenario, but if there is no response for at least a given period of time after a message from the security terminal 1, or if the audio automatic response module 14 detects that a response that will not let the conversation proceed smoothly has been given more than certain times, then this is judged to be an anomalous response (#31). Moreover, the emergency detection module 16 receives emergency messages sent by the user from mobile terminal 2 by operating the control portion 23 (#32). When an emergency message is received, the emergency detection module 16 judges that an emergency has occurred.

If an emergency has been detected by detecting an anomalous movement of the mobile terminal 2, an anomalous response by the user, or an emergency message from the mobile terminal 2, then the emergency information display module 17 displays the fact that an emergency has occurred on a display of the security terminal 1 or the like (#33). In addition or instead of this display, it is also possible to give an acoustic alarm that an emergency has occurred. If the mobile terminal 2 is equipped with a video taking portion 24, then the emergency information display module 17 should output the video data from the mobile terminal 2 on the display. The operator of the security terminal 1 can thus easily confirm whether there is an emergency or not.

The communication module 19 performs a telephone communication process between the operator of the security terminal 1 and the user of the mobile terminal 2 (#34). That is to say, the communication module 19 receives voice input from the operator of the security terminal 1 and sends it to the mobile terminal 2, and the audio data sent from the mobile terminal 2 is output to the speaker. The switching from the automatic responses with the audio automatic response module 14 to direct telephone communication is performed when the communication module 19 receives a switching instruction from the operator of the security terminal 1, for example. By directly talking to the user of the mobile terminal 1, the operator of the security terminal 1 can confirm whether an emergency message has been sent by a user mistake, for example, or whether the user is actually in an emergency. If the operator of the security terminal 1 confirms by telephone communication or video images that the user is actually in an emergency, then a rescue request is entered by operating a button displayed on the screen or a predetermined key on a keyboard (#34).

The rescue request module 18 receives the input of the rescue request, and sends the rescue request to the rescue request receiving terminal 4. More preferably, when the rescue request module 18 has received the input of a rescue request, position information of the mobile terminal 2 for which an emergency has been detected as well as personal information about its users are read out from the user DB 12 (#35). The rescue request module 18 sends out a rescue request together with the position information and personal information that have been read out (#36). It is preferable that the rescue request includes information about the requested rescue. Information about the rescue may be "someone is sick/wounded" or "a crime has occurred" or the like. The operator of the rescue request receiving terminal 4 that has received the rescue request can undertake appropriate measures, based on the user's position information and personal information. Examples of such measures include dispatching a doctor or nurse for emergency medical treatment, dispatching security personnel and notifying the police.

Other Embodiments (A) The scope of the present invention also includes recording media storing a program executing the method for providing security according to the present invention, as well as such programs. Examples of such recording media include computer-readable floppy disks, hard disks, semiconductor memories, CD-ROMs, DVDs, magneto-optical disks (MOs) among others.

(B) If a usage fee for the security service is charged, then it is conceivable to store the usage frequency of each mobile terminal 2, for example the provided information amount, and to lower the service fee the larger that information amount is. Thus, an incentive for the user to repeatedly use the service can be expected.

With the method for providing security according to the present invention, a security service provider prepares conversation scenarios with advertisements as content. Consequently, the operator will not run out of content for conversations with the user, and moreover can take in the funds for providing the service through advertising fees. Thus, the security service provider can, at low cost, prevent crimes before they happen, and provide a security service that can respond quickly to emergency situations.

Moreover, with the method for providing security according to the present invention, by outsourcing the services regarding the user's security and rescue operations, the costs for providing security services can be lowered, and a high-quality response to emergency situations becomes possible.

Furthermore, since the mobile terminals can use services provided by organizations other than the security service provider, one can expect that users will continuously use these services, leading to an increasing effect of the advertisements.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for providing security to be executed by a computer, comprising:
    a storage step of storing conversation scenarios that are content for voice conversations carried out with a user operating a mobile terminal;
    an automatic response step of selecting any of the conversation scenarios upon a connection from the mobile terminal and exchanging audio data with the mobile terminal in accordance with the selected conversation scenario;
    a position information obtaining step of obtaining position information of the user's mobile terminal;
    an emergency detection step of detecting, by monitoring a transmitting situation of the audio data transmitted to the mobile terminal based on the selected conversation scenario and a receiving situation of the response audio data from the mobile terminal in the automatic response step, that an emergency involving the user has occurred if no response audio data for a predetermined time period is detected; and
    an emergency output step of outputting a signal indicating an emergency in a visible or audible manner if an emergency has been detected in the emergency detection step.

2. The method for providing security according to claim 1, wherein the emergency detecting step monitors a change of position information obtained in the position information obtaining step and detects an emergency when no response audio data is detected for a predetermined time period and/or when sudden change of response audio data is detected.

3. The method for providing security according to claim 1, wherein the emergency detection step detects an emergency by receiving a signal indicating the occurrence of an emergency from the user's mobile terminal.

4. The method for providing security according to claim 1, further comprising a request sending step of receiving input of a rescue request signal requesting rescue of a user in an emergency, and sending the rescue request signal and position information of the user's mobile terminal to a computer to which the rescue request signal is sent.

5. The method for providing security according to claim 4,
    further comprising a user storage step of storing personal information of a user;
    wherein, in the request sending step, personal information of the user in an emergency is sent to said computer.

6. The method for providing security according to claim 1, further comprising a telephone communication step of receiving instruction of direct telephone communication with the user from an operator of said computer, receiving audio input of the operator and sending the audio input to the user's mobile terminal, and outputting the received audio from the mobile terminal.

7. The method for providing security according to claim 1, further comprising:
    a history storage step of storing a usage history of conversation scenarios;
    a history update step of updating the usage history of conversation scenarios executed by the automatic response step.

8. The method for providing security according to claim 1, wherein the position information obtaining step obtains the position information by GPS (Global Positioning System).

9. The method for providing security according to claim 1, wherein
    the position information obtaining step obtains position information of the mobile terminal from the position detection system; and
    the position information detection system is configured including a base station that relays communication between mobile terminals, and calculates an absolute position of the mobile terminal based on an absolute position of the base station and a relative position of the mobile terminal to the base station.

10. The method for providing security according to claim 1, wherein, in the automatic response step, a database is accessed that stores the conversation scenarios that are the content for the voice conversation performed with the mobile terminal of the user, and audio data is exchanged with the user's mobile terminal in accordance with one of the conversation scenarios in the database.

11. The method for providing security according to claim 1, wherein, in the automatic response step, the exchange of audio data is performed via a plurality of networks with different communication protocols.

12. The method for providing security according to claim 1, wherein, in the emergency output step, image data is received from the user's mobile terminal, and the image data is output.

13. The method for providing security according to claim 1,
further comprising an authentication information storage step of storing authentication information of the user;
wherein in the automatic response step, a connection request is received from the user's mobile terminal, and an authentication of the user is performed in accordance with the authentication information of the user.

14. A device for providing security, comprising:
a storage means for storing conversation scenarios that are content for voice conversations carried out with a user operating a mobile terminal;
an automatic response means for selecting any of the conversation scenarios upon a connection from the mobile terminal and exchanging audio data with the mobile terminal in accordance with the selected conversation scenario;
a position information obtaining means for obtaining position information of the user's mobile terminal;
an emergency detection means for detecting, by monitoring a transmitting situation of the audio data transmitted to the mobile terminal based on the selected conversation scenario and a receiving situation of the response audio data from the mobile terminal in the automatic response means, that an emergency involving the user has occurred if no response audio data for a predetermined time period is detected; and
an emergency output means for outputting a signal indicating an emergency in a visible or audible manner if the emergency detection means detects an emergency.

15. A program for providing security, which lets a computer function as:
a storage means for storing conversation scenarios that are content for voice conversations carried out with a user operating a mobile terminal;
an automatic response means for selecting any of the conversation scenarios upon a connection from the mobile terminal and exchanging audio data with the mobile terminal in accordance with the selected conversation scenario;
a position information obtaining means for obtaining position information of the user's mobile terminal;
an emergency detection means for detecting, by monitoring a transmitting situation of the audio data transmitted to the mobile terminal based on the selected conversation scenario and a receiving situation of response audio data from the mobile terminal in the automatic response means, that an emergency involving the user has occurred if no response audio data for a predetermined time period is detected; and
an emergency output means for outputting a signal indicating an emergency in a visible or audible manner if the emergency detection means detects an emergency.

16. A computer-readable recording medium storing a program for providing security to be executed by a computer, for executing:
a storage step of storing conversation scenarios that are content for voice conversations carried out with a user operating a mobile terminal;
an automatic response step of selecting any of the conversation scenarios upon a connection from the mobile terminal and exchanging audio data with the mobile terminal in accordance with the selected conversation scenario;
a position information obtaining step of obtaining position information of the user's mobile terminal;
an emergency detection step of detecting, by monitoring a transmitting situation of the audio data transmitted to the mobile terminal based on the selected conversation scenario and a receiving situation of the response audio data from the mobile terminal in the automatic response step, that an emergency involving the user has occurred if no response audio data for a predetermined time period is detected; and
an emergency output step of outputting a signal indicating an emergency in a visible or audible manner if an emergency has been detected in the emergency detection step.

17. A method of providing security by executing operations on a computer, comprising:
selecting a bilateral conversation scenario from among predetermined bilateral conversation scenarios requiring user operation of a mobile terminal;
detecting an emergency involving the user taking into consideration the bilateral conversation scenario selected; and
outputting a signal indicating the emergency if the emergency has been detected.

18. The method for providing security according to claim 17, further comprising exchanging audio data with the mobile terminal in accordance with the bilateral conversation scenario selected.

19. The method for providing security according to claim 17,
further comprising detecting position information of the mobile terminal, and
wherein said detecting of the emergency includes detecting at least one of an anomalous audio response in the bilateral conversation scenario by a user of the mobile terminal, no audio response during the bilateral conversation scenario by the user of the mobile terminal, and anomalous change of position information.

* * * * *